United States Patent
Krishnan et al.

(10) Patent No.: US 7,840,821 B2
(45) Date of Patent: Nov. 23, 2010

(54) METHOD AND APPARATUS FOR MONITORING ENERGY CONSUMPTION OF AN ELECTRONIC DEVICE

(75) Inventors: Guhan Krishnan, Chelmsford, MA (US); Sebastien Nussbaum, Reading, MA (US)

(73) Assignee: Globalfoundries Inc.

( * ) Notice: Subject to any disclaimer, the term of this patent is extended or adjusted under 35 U.S.C. 154(b) by 776 days.

(21) Appl. No.: 11/750,868

(22) Filed: May 18, 2007

(65) Prior Publication Data

US 2008/0288123 A1 Nov. 20, 2008

(51) Int. Cl.
*G06F 1/00* (2006.01)
*G06F 12/00* (2006.01)

(52) U.S. Cl. .................. 713/300; 713/330; 711/105

(58) Field of Classification Search ............... 713/300, 713/330
See application file for complete search history.

(56) References Cited

U.S. PATENT DOCUMENTS

| 6,747,912 | B1 | 6/2004 | Riesenman |
| 7,281,140 | B2 * | 10/2007 | Burns et al. ............... 713/300 |
| 2003/0093614 | A1 * | 5/2003 | Kohn et al. ............... 711/105 |
| 2007/0050600 | A1 * | 3/2007 | Hill et al. .................. 712/214 |
| 2008/0103633 | A1 * | 5/2008 | Holmquist et al. ......... 700/293 |

* cited by examiner

*Primary Examiner*—Suresh K Suryawanshi

(57) ABSTRACT

Requests to an operational module are received at a monitoring device, where an estimated amount of energy expected to be consumed by the operational module while executing operations related to requests is accumulated for a sliding time window. A throttle signal is generated to limit the amount of energy consumed by the operation module is generated when the accumulated amount exceeds a maximum amount.

20 Claims, 4 Drawing Sheets

| | CYCLES # | ENERGY WT1 | ENERGY WT2 | ENERGY µA/CYCLES # |
|---|---|---|---|---|
| PRECHARGE | 1 | 1 | 2 | 15 |
| ACTIVATE | 1 | 1 | 3 | 20 |
| AUTO-PRECHARGE | 1 | 1 | 2 | 17 |
| READ (BURST 4) | 2 | 4 | 8 | 110 |
| WRITE (BURST 4) | 2 | 4 | 8 | 105 |
| READ (BURST 8) | 4 | 8 | 16 | 220 |
| WRITE (BURST 8) | 4 | 8 | 16 | 210 |

US 7,840,821 B2

METHOD AND APPARATUS FOR MONITORING ENERGY CONSUMPTION OF AN ELECTRONIC DEVICE

BACKGROUND

1. Field of the Disclosure

The present disclosure relates generally to electronics, and more particularly to controlling energy consumption of electronic devices.

2. Description of the Related Art

System devices can overheat or have reduced battery life when their sub-devices consume more energy than expected. Various ways of detecting when devices are consuming too much energy have been proposed. For example, a device can shut down or be throttled when a temperature at the device is exceeded. However, this solution does not deterministically limit energy consumption over a number of cycles. Another proposed solution is to set a frequency of a device at a sufficiently low frequency to guarantee the device will not draw more a desired current under any operating condition. However, this artificially imposes a frequency value that is likely to affect performance. Therefore, an apparatus and method of controlling energy consumption of an electronic device overcoming these problems would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with a specific embodiment of the present disclosure, a request is received at a DRAM, wherein an amount of energy will be consumed by the Dram to execute the request. Simultaneously the request is received at a monitoring device where an estimated energy consumption based upon the request is updated. A control indicator is generated by the monitoring device when a heuristic based upon the estimated energy consumption is met. The heuristic can further be based upon energy consumption within a sliding time window. Specific embodiments of the present disclosure will be better understood with reference to FIGS. 1-7.

Figure 1:
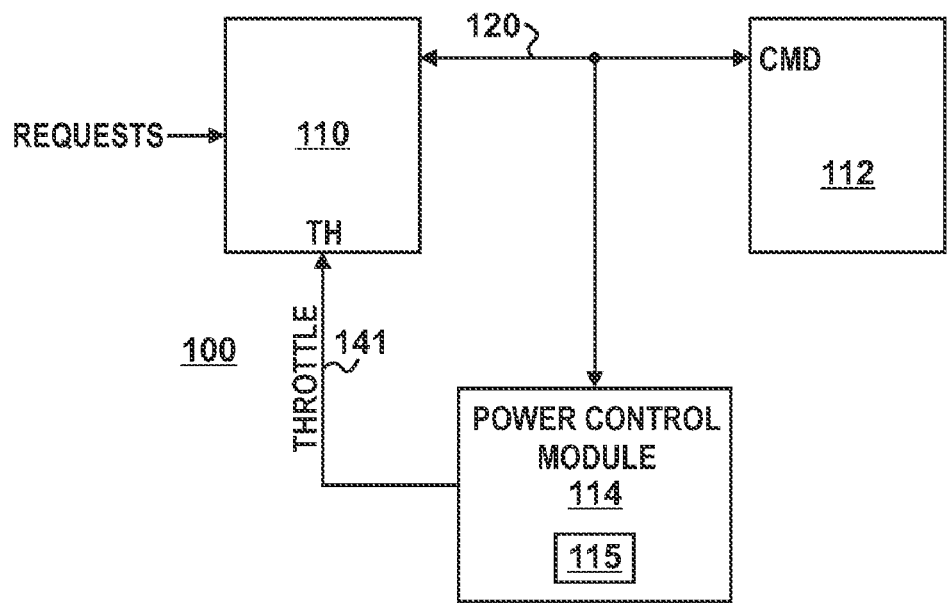
FIG. 1 illustrates a block diagram in accordance with a specific embodiment of the present disclosure.

FIG. 1 illustrates a specific embodiment of a system device 100 that reduces a device's energy consumption if a heuristic based upon the device's energy consumption has been met. System device 100 is illustrated to include a plurality of electronic devices including device 110, device 112, and power control module 114. Device 110 is connected to device 112 and to power control module 114 via an interconnect 120. Interconnect 120 can communicate data and control information between device 110 and device 112. Interconnect 120 connects one or more serial or parallel ports of device 110 to device 112. Device 114 includes an input connected to interconnect and an output terminal connected to input terminal TH of device 110.

During operation, device 110 provides information to device 112 that controls operation of device 112. For example, device 110 can be a memory controller that provides various requests and data to a memory device (device 112) that control access thereto. In another embodiment, device 110 can be a memory that provides data, i.e., instruction opcodes, to a processor device (device 112). In yet another embodiment, device 110 can be an instruction dispatch engine of a processor pipeline that provides instructions to a downstream portion of the pipeline (device 112) for execution. For purposes of discussion herein, device 110 is considered to be a memory controller, and is generally referred to as controller 110, while device 112 is considered to be a dynamic random access memory (DRAM) and is generally referred to as memory 112. Note that each of devices 110, 112, and 114 can also be referred to as operational modules, wherein an operational module is understood to include a portion of a system device that performs a specific operation in response to received information.

Memory 112 performs a specific operation in response to receiving a specific command at interconnect 120. In one embodiment, a request is received by memory 112 after appropriate data and control signals have been asserted at interconnect 120 by controller 120. Depending upon the specific implementation of memory 112, an acknowledge signal may need to be provided from memory 112 to controller 110 to confirm receipt of the command.

It will be appreciated that requests, also referred to as commands, can be implemented using different types of information to request performance of specific operations at memory 112. For example, control 110 can provide a request in the form of control signals to specific terminals of memory 112, such as a read/write input terminal. In another embodiment, control 110 can provide op-codes to the memory 112. Examples of different requests capable of being executed at memory 112 include: a precharge command used to close an open bank; an activate command used to open a closed bank; a read command; a write command; and an auto-pre command used to close an open bank at the end of a current access. Other commands may also exist that are variations of these commands, such as commands that indicate the use of bursting, and commands that indicate a width of data to be accessed. For example, request to access an amount of data greater than the data width of the memory 112 can be interpreted as a burst request, whereby multiple read or write accesses are performed by memory 112 for a single request.

Power control module 114 is connected to interconnect 120 to receive requests passed between controller 110 and memory 112 that will result in memory 112 consuming energy as a result of performing an operation based upon the request. In response to receiving requests between controller 110 and memory 112, power control module 114 will update an estimated amount of energy used at memory 112 over a period of time. For example, for each request, power control module 114 can determine a value that corresponds to an amount of energy to be consumed by memory 112 for that request, and add this amount to an accumulation value representing an estimate of the total energy consumed by memory 112 over an accumulation time.

In one embodiment, the accumulation time is a sliding window that is periodically updated to include only a most recent set of requests. The sliding window can be updated in real-time, i.e., updated for every possible access cycle of memory 112. For example, the sliding window can be for 128 access cycles of memory 112, whereby at each access cycle the energy consumption of the newest access cycle (cycle 0) is added to the accumulation value, while the energy consumption of the oldest access cycle (cycle 128) is subtracted from the accumulation value.

Alternatively, the sliding window can be updated at a coarser resolution, whereby an average energy consumption per access cycle is determined for a defined time interval that is used to maintain the accumulated energy value. For example, a base time interval can be defined to be 16 access cycles. As such, the total expected energy consumption of the memory 112 for each 16 access cycle can be maintained, and divided by 16 to provide an average energy per access cycle for each base time interval. This value can then be accumulated over a defined amount of time, such as for 8 base time intervals to monitor energy consumption over 128 access cycles at a resolution of 16 access cycles.

When it is determined that the amount of energy used by memory 112 has surpassed a defined amount, the power control module 114 will provide a throttle signal to control 110. In response to receiving the throttle signal, control 110 will reduce energy consumption of memory 112 by not providing any more requests to memory 110. The energy consumption of memory 112 may be reduced in other ways as well, for example, by operating at a slower rate, at a reduced voltage, and by other appropriate energy saving schemes.

In one embodiment the maximum amount of energy to be consumed by the memory 112 before the Throttle signal is provided is user programmable at storage location 115 of the power control module 114. Specific embodiments of the system device 100 will be better understood with reference to FIGS. 2-7.

Figure 2:
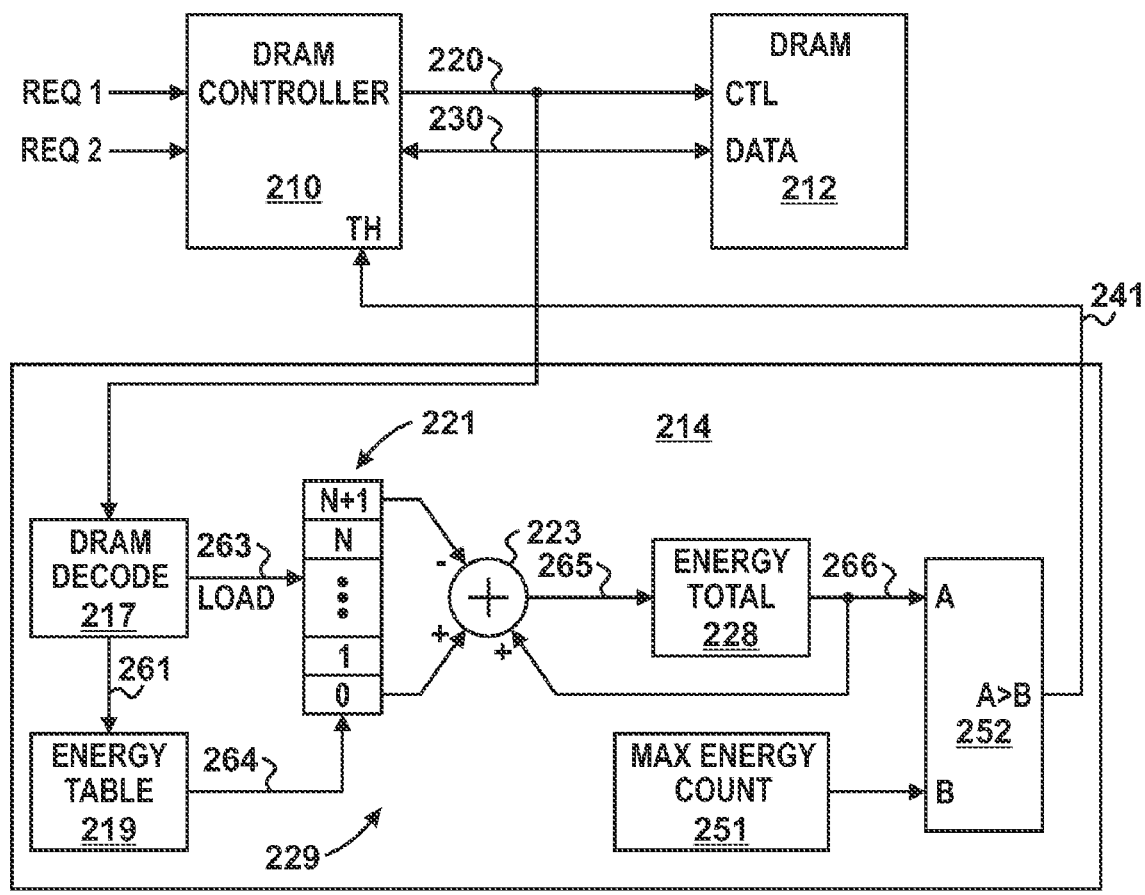
FIG. 2 illustrates a block diagram in accordance with a specific embodiment of the present disclosure.

FIG. 2 illustrates a specific embodiment of a device comprising a DRAM controller 210 corresponding to device 110 of FIG. 1, a DRAM 212 corresponding to device 212 of FIG. 1, and a power control module 214 corresponding to device 114 of FIG. 1. The DRAM controller 210 is connected to the DRAM 212 via interconnect 220, which can communicate control information between DRAM controller 210 and DRAM 212, and by interconnect 230, which can communicate data between DRAM controller 210 and DRAM 212.

Power control module 214 is illustrated to include a DRAM decode module 217, a energy table 219, a FIFO 221 (first-in-first-out-memory), a summer 223, storage locations 228 that operate as an energy monitoring module; a storage location 251; and a comparator 252. The DRAM decode module 217 is connected to receive requests from interconnect 220, and to provide information at interconnect 261 for energy table 219 and at interconnect 263 for FIFO 221. Energy table 219 is connected to provide data at interconnect 264 for FIFO 221. Summer 223 is connected to the first and last storage locations of FIFO 221 to receive the value most recently stored at FIFO 221 and to receive the value that was least recently stored, i.e., the oldest value. In addition, the summer 223 is connected interconnect 266, to receive a previous accumulated value from storage location 228, and to interconnect 265, to provide an updated accumulated value to storage location 266. Comparator 252 is connected to interconnect 266 and to storage location 251, and can provide a THROTTLE signal at interconnect 241 in response to the energy total at storage location 228 being greater than the max energy count at storage location 251.

During operation, DRAM controller 210 provides requests via interconnect 220 to DRAM 212. Requests from DRAM controller 210 can include commands, such as control signals and op-codes. After receiving a request DRAM 212 executes a corresponding operation to facilitate data accesses, i.e., reading and writing. Requests provided to the DRAM 212 are simultaneously provided to the DRAM decode module 217 of the power control module 214. In one embodiment, the power control module 214 receives requests by snooping the interconnect 220, i.e., receives information at the interconnect 220 that is primarily intended to control a different operational device that consumes energy in response to the request.

The request at interconnect 220 is decoded by the power control module 214 to facilitate providing information to interconnect 261 that is used to access an entry at energy table 219. The entry at energy table 219 stores a energy count associated with the DRAM 212 for the request at interconnect 220 that will be provided to interconnect 264. The term "energy count" as used herein is intended to refer to a value that indicates a amount of energy or a relative amount of energy that is expected to be consumed by a device. Use of the term energy count will be better understood with reference to the table of FIG. 3.

Figures 3, 4:
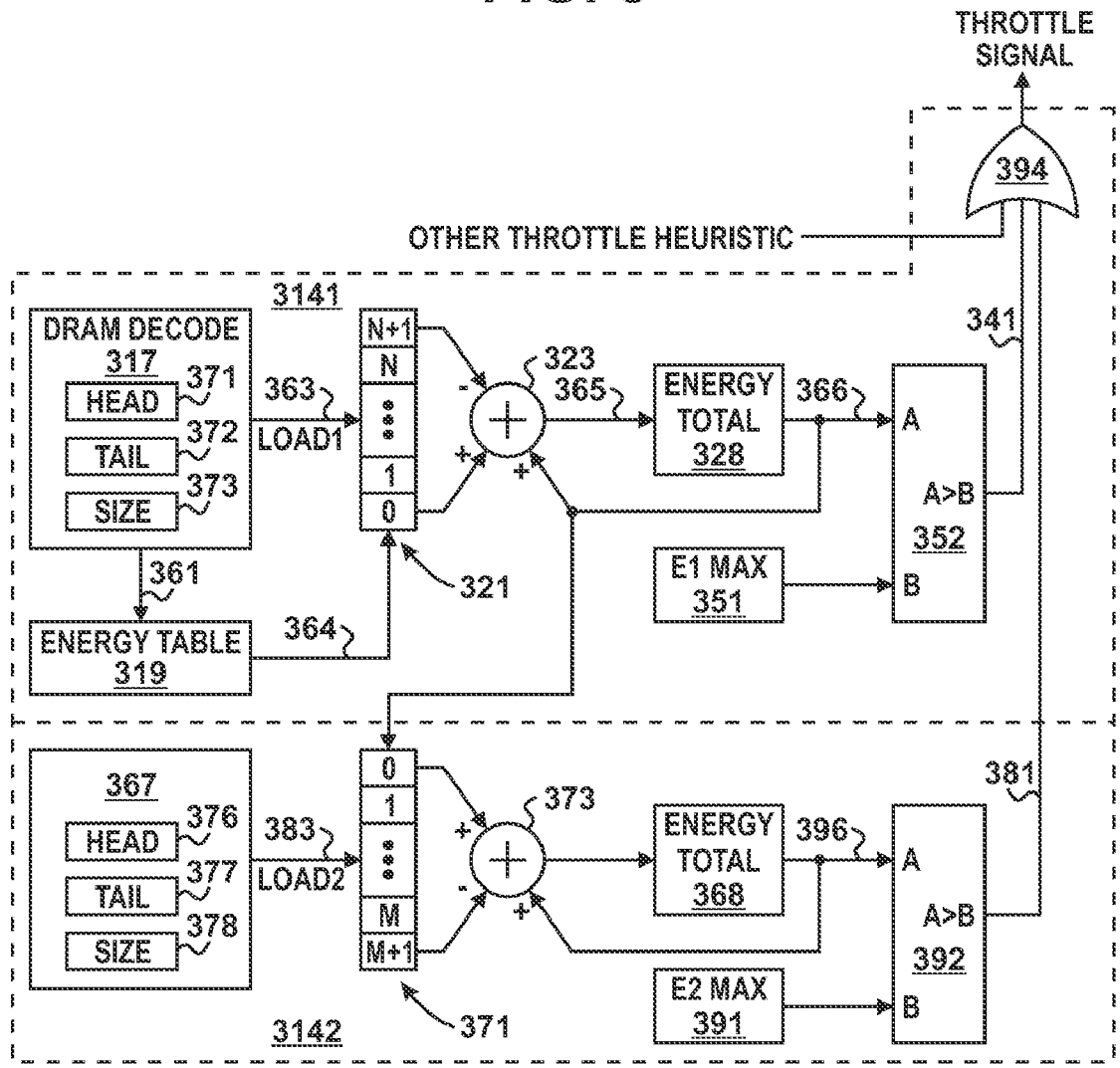
FIG. 3 illustrates a table representing information stored a portion of FIG. 2.
FIG. 4 illustrates a block diagram of a monitoring module in accordance with a specific embodiment of the present disclosure.

The table of FIG. 3 is illustrated to include five columns. The first column, labeled INFORMATION, lists operations that can be represented by information that can be provided to DRAM 212 from DRAM controller 210 to control operation of the DRAM 212, while rows two through five of the table represent energy counts associated with different possible units of measure.

With respect to the operations listed at the first column, the first row of data is associated with a command labeled "PRE-CHARGE", the second row of data is associated with a command labeled "ACTIVATE", the third row of data is associated with a command labeled "AUTO-PRECHARGE", the fourth row of data is associated with a command labeled "READ (BURST 4)", the fifth row of data is associated with a command labeled "WRITE (BURST 4)", the sixth row of data is associated with a command labeled "READ (BURST 8)", the seventh row of data is associated with a command labeled "WRITE (BURST 8)".

With respect to the energy counts listed at the column labeled CYCLES, each of the energy counts are integers indicating a number of cycles needed to perform the command. The underlying assumption for setting the energy counts equal to the number of cycles used to perform a specific command is that the amount of energy consumed by the DRAM 212 during cycle during the execution of a command is approximately the same, or close enough to being the same, to provide an appropriate indication of the amount of energy being used.

With respect to the energy counts listed at the column labeled ENERGY WT1, each of the energy counts integers that are weighted relative to each other to indicate a relative amount of energy used by each command. For example, a energy count of one (1) would represent the smallest amount of energy associated with a command, while the values at each of the other instructions would be selected to be an integer multiple best representing the amount of energy consumed by the DRAM 212 during its execution relative the energy associated with a energy count of one (1). Note that the column labeled ENERGY WT2, does not contain a energy count of one (1), thereby indicating that the amount of energy of a energy count of one (1) represents a base amount of energy consumption that is less than the energy consumed by the command requiring the least amount of energy. The underlying assumption for using weighted values is that the amount of energy consumed by the DRAM 212 during execution can be represented accurately by assigning relative energy counts to each command, whereby the energy counts can be accumulated to represent a total amount of energy expected to be consumed by DRAM 212.

With respect to the energy counts listed at the column labeled ENERGY uA, each of the energy counts represent actual energy units, micro-amps in this example. Note that this is similar to using weighted values, except that the base amount of energy is equal to one micro-amp. The underlying assumption for using actual energy values is that the amount of energy consumed by the DRAM 212 during execution needs to be precisely monitored. Note that while amps is not a measure of energy consumption, it can be accurately used to represent relative energy consumption assuming a steady supply voltage. Note that, the table of FIG. 3 can be expanded to include additional entries that can be accessed when a device is capable of operating at different voltages.

Note that the energy counts for a specific command, such as a READ (BURST 8) command is consumed over four access cycles. Other commands that result in multiple operations being executed by the DRAM 212 can consume the energy over even more access cycles. While the specific embodiment disclosed herein treats the energy count as occurring at a single access cycle, other embodiments are anticipated whereby the energy count is accumulated with the total energy count over a plurality of access cycles. For example, the energy count for READ (BURST 8), 220, could be accumulated into a total energy count, maintained at storage location 328, by adding 55 energy counts to each of four consecutive cycles.

Referring back to FIG. 2, the FIFO 221, summer 223, and storage location 228 form part of an accumulation module that maintains an accumulated energy count over a sliding time window for defined amount of time. While a sliding time window for a defined amount of time can be maintained in many different ways, a specific embodiment is illustrated whereby each entry of a FIFO 221 corresponds to particular period of time, such as one access cycle of DRAM 212. For example, assuming that DRAM 212 can be accessed every 5 ns (access period), and that the accumulated energy count, i.e., an estimate of the energy consumption of DRAM 212, is not to be exceeded by the DRAM 212 in any 640 ns period is 64 energy counts, the FIFO will need 128 entries to store the energy count associated with each access cycle over the desired 640 ns time period.

At reset, FIFO 221 is preloaded with zeros, and at each subsequent access cycle a new energy count is stored at FIFO 221 while allowing the oldest energy count to be flushed from the FIFO 321 after being subtracted from the accumulated energy count. For example, after reset, the total energy count at storage location 228 will be zero, since each entry of the FIFO 221 will be preset to zero. In response to the first access cycle after reset, the energy count associated a request provided to DRAM 212 during that access cycle, if any, will be stored at the top of FIFO 221. Assuming there is valid request at interconnect 220 during the first access cycle, e.g., a request corresponding to an entry in the energy table 219, the corresponding energy count at the table will be provided to the FIFO 221 for storage. Otherwise, a energy count of zero (0) will be provided from the energy table 219 to the FIFO 221 for storage.

The total energy count at storage location 228 is updated at each access cycle by adding the newest energy count, the value at location 0 of the FIFO, to the total energy count, and subtracting from this value the oldest energy count, the energy count at location N+1, that is associated with an access cycle that is no longer within the sliding time window. A value at the output of summer 323 is stored at storage location 228 and represents the accumulated energy count. It will be appreciated that timing and control information associated with storing data at FIFO 221 and for updating the total energy count at storage location 228 can be accomplished by the signal LOAD1 from DRAM control module 217.

A comparator 252 compares the total energy count at storage location 228 to a max energy count at storage location 251 to determine if the amount of energy to be consumed by DRAM 212 needs to be reduced. For example, when the accumulated energy count, i.e., the value at storage location 228, exceeds the maximum energy count stored at storage location 251 a throttle signal can be provided at interconnect 241 for DRAM 212. In response to receiving the THROTTLE signal the controller 210 cause the future energy consumption of DRAM 212 to be limited. In one embodiment, the energy consumption of DRAM 212 is limited by not providing requests to DRAM 212 while the THROTTLE signal is being provided. In this manner, the energy consumption of a specific electronic device, such as DRAM 212, can be controlled.

FIG. 4 illustrates an alternate embodiment of a power control module that can be used in place of power control module 214 of FIG. 2 that supports the use of multiple heuristics including a heuristic that is based not only on a user programmable maximum energy count, but also a user programmable duration of the accumulation time window. The power control module of FIG. 4 includes a first portion 3141 that is similar to the power control module 214 of FIG. 2, and a second portion 3142 that can use accumulated energy counts from the first portion 3141 to maintain a second total energy count for a sliding time window having a longer period of time.

The first portion 3141 of the power control module of FIG. 4 includes an embodiment that is different from the DRAM control module 217 of FIG. 2 in that DRAM decode module 317 allows for the size of the FIFO 221 to be specified by the user. By defining the size of FIFO 321, the accumulation time associated with the sliding time window becomes user programmable. The DRAM decoder 317 implements FIFO 321 by maintaining a head pointer at storage location 371, a tail pointer at storage location 372, and a size of the FIFO at storage location 373. As previously described, each storage location of the FIFO 321 corresponds to an access cycle, which in turn corresponds to a specific amount of time. Therefore, the SIZE indicator at storage location 373 can be used by DRAM controller 317 to set and maintain the head and tail pointers, thereby facilitating DRAM controller 317 to store the newest energy count at the top of the FIFO and to provide the oldest energy count that is no longer within the sliding time window to the summer 323 so that it can be subtracted from the accumulated energy count. A maximum accumulation time is dependent upon the size of the FIFO 321, which is illustrated as having L storage locations. In the embodiment illustrated, the last entry of the FIFO is outside the accumulation window, making the maximum accumulation window equal to (L−1) access cycles.

It will be appreciated that energy table 319 corresponds to and has similar functionality as energy table 219, FIFO 321 corresponds to and has similar functionality as FIFO 221, summer 323 corresponds to and has similar functionality as summer 223, storage location 328 corresponds to and has similar functionality as storage location 228, comparator 352 corresponds to and has similar functionality as comparator 252, and storage location 351 corresponds to and has similar functionality as storage location 251. Similarly, interconnects 361, 363, 364, 365, 366, and 341 correspond to and carry similar information as interconnects 261, 263, 264, 265, 266, and 241, respectively.

The power control module of FIG. 4 includes a second portion 3142 that can use the total energy count at storage location 328 to maintain a second heuristic having a longer accumulation time. According to the illustrated embodiment, portion 3142 can implement a sliding time window of a duration that that is an integer multiple of the sliding time window used at portion 3141. For example, if portion 3141 has a sliding time window corresponding to 64 access cycles, portion 3142 can implement an accumulation window that is an integer multiple of 64 access cycles, such as 2048 access cycles. The size of a second FIFO 371, and thus the duration of the sliding time window of portion 3142, is defined by the size value stored at storage location 378.

During operation, FIFO 371, operates similarly to FIFO 321 as previously described and is, therefore preloaded with zeros (0) at reset to generate an initial accumulated energy count of zero at storage location 368. However, the total energy count, i.e., the accumulated energy count, is loaded at FIFO 371 from storage location 328 at an interval defined by the size stored at storage location 373. For example, the total energy count at storage location 328 will be stored at FIFO 371 once every 64 clock cycles, which corresponds to each time FIFO 371 contains all new data used to define the energy total 328. Therefore, the accumulated energy counts of portion 3141 at storage location 328 are themselves accumulated at storage location 368 in a similar manner as individual energy counts are accumulated at portion 341. Comparator, 392 determines whether the accumulated energy count at storage location 368 is greater than a maximum energy count stored at storage location 391 a throttle signal will be generated to reduce energy consumption of the DRAM as previously discussed.

It will be appreciated that additional energy heuristics can be monitored in a similar manner as portion 3141, i.e., a heuristic based upon a fine resolution, by providing additional storage locations to portion 3141 to store additional accumulation energy counts for additional accumulation times. The additional accumulation times can be implementing by providing additional control within DRAM decode module 317 to support access of intermediate locations of FIFO 321 that corresponding to additional accumulation times. Similarly, additional energy heuristics can be implemented having a course resolution as discussed with reference to portion 3142. For example, the same FIFO 321 can be used to support multiple energy heuristics as previously described, by storing additional TAIL pointers and SIZE pointers.

The THOTTLE signal is provided in response to any on of a plurality of heuristics being met. For example, a plurality of devices, such as portion 3141 and portion 3142 can provide a THROTTLE signal to or-gate 394 in response to determining a specific heuristic has been met. In addition, signal for other throttle heuristics can be provided to or-gate 394. For example, a signal from DRAM 212 that indicates a temperature has been exceeded at DRAM 212 can be provided to or-gate 394, whereby the dram controller 210 can reduce energy consumption of DRAM 212.

Figure 5:
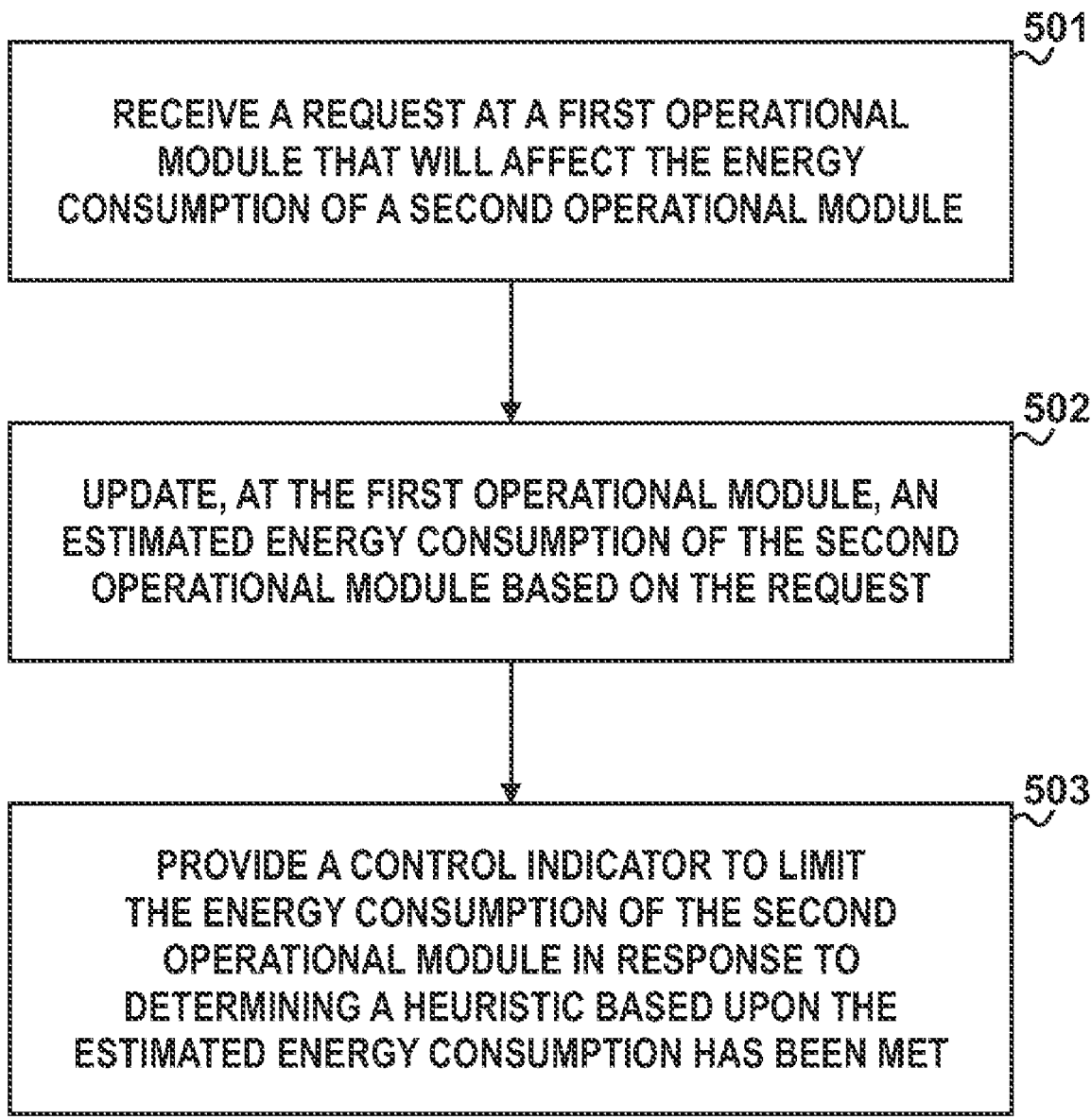
FIG. 5 illustrates flow diagram of a method in accordance with a specific embodiment of the present disclosure.
Figure 6:
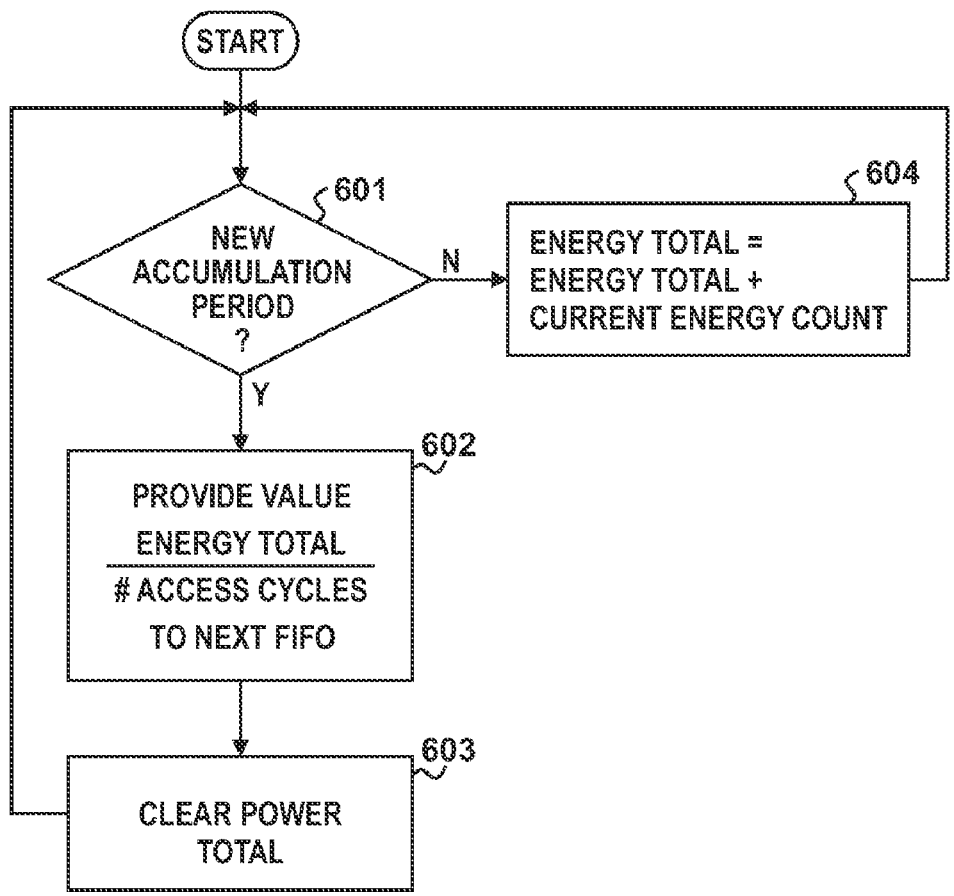
FIG. 6 illustrates flow diagram of a method in accordance with a specific embodiment of the present disclosure.

FIG. 5 illustrates a method in accordance with a specific embodiment of the present disclosure. At block 501, a request that will effect the energy consumption of a second operation module is received at a first operational module. As previously discussed, an operational module, which itself is a device, is understood to include a portion of a system device that performs a specific operation in response to received information.

Figure 7:
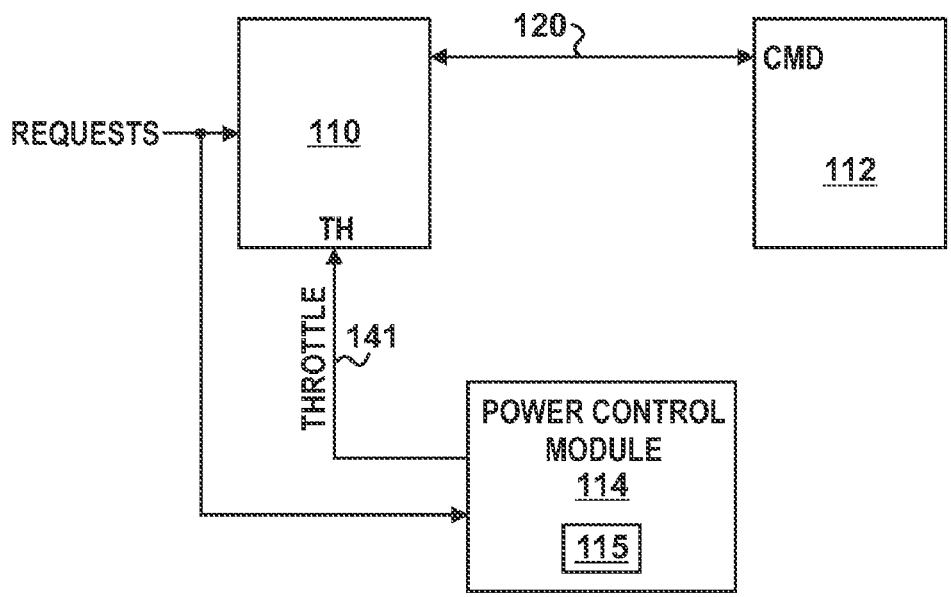
FIG. 7 illustrates a block diagram in accordance with a specific embodiment of the present disclosure.

In one embodiment, the request is used to control the operational of the second operational module, such as to access data at a DRAM, and is one request of a set of requests. The set of requests can include different requests, including a first request and a second request, wherein the second operational module performs a first operation in response to the first request and a second operation in response to the second request. The requests can be communicated as a variety of command types. For example, the commands can be opcodes, a set of control signals, and the like, whereby the second operational module is responsive to the command type to execute the specific command. The information received at the first operational module, such as a power control module, by snooping an interconnect. The snooped interconnect can be connected to the second operational module, or connected to an operational module that in turn provides subsequent requests to the second operational module. For example, referring to FIG. 1, the interconnect 120 is illustrated as being snooped by power control module 114, however, in an alternate embodiment the interconnect providing the requests to controller 110 can be snooped instead, as illustrated in FIG. 7, or in addition to interconnect 120. In this embodiment, the controller would assign energy counts for memory 112 based upon requests received at controller 112, instead of for requests provided directly to memory 110.

At block 502 an estimated energy consumption of the second operational module is updated at the first operational module based upon the request. In one embodiment, updating the estimated energy consumption comprises decoding the request at a power control module to determine which requests are to be performed by second operational module and maintaining at the power control module an accumulated energy count associated with the electronic device during an accumulation time defined by a sliding time window. It will be appreciated that an accumulation time associated with a sliding time window is the amount of time during which the energy count is to be accumulated. Therefore, an accumulation time for a sliding time window of 1-microsecond results in an accumulated energy count representing the total amount of energy to be consumed by the electronic device for the most recent 1 microsecond.

As previously discussed, it will be appreciated that the energy count can be the same or different for the first and second commands. The energy count can be represented as an integer or a real number. A energy count of one (1) can represent a number of cycles needed to perform an operation. A energy count of one (1) can represent one base unit of energy.

At block 503, the energy consumption of the electronic device is limited in response to determining the heuristic has been met. For example, the electronic device can be throttled to prevent receiving, e.g., acknowledging, additional signals until a throttle indicator is removed in response to determining a heuristic based upon the total energy count has been met. For example, a heuristic based upon the total energy count can be considered met when a maximum amount of energy consumed, or to be consumed, by the electronic device is expected surpassed as a result of requests provided to the second operational module. The heuristic can further require that the maximum amount of energy consumption be exceeded during a specific amount of time. The specific amount of time can be fixed or user programmable at a storage location. The maximum amount of energy consumption can be fixed or user programmable at a storage location.

It will be appreciated that many variations to the previously discussed disclosure can be implements. For example, while the specific embodiment discussed dealt primarily with a DRAM, other types of memories and operational module can use the same techniques. For example, static RAM as well as dynamic RAM can be monitored. Examples of other operational modules can include, processing devices, such as central processor units, that perform operations by decoding opcodes.

Furthermore, many different ways of accumulating a energy count are anticipated. For example, referring to FIG. 6, a method determines an average energy consumption over a period of time is disclosed that can replace the FIFO 221, and summer 223 is described.

At block 601, it is determined whether a new accumulation period has started. If so, flow proceeds to block 602, otherwise flow proceeds to block 604. Reset is not considered a new accumulation period with respect to the flow of FIG. 6. At block 604, following reset, the energy count total is incremented by a energy count of an operational module in response to a current request, and flow proceeds to block 601. Additional energy counts are accumulated in the loop including block 601 and 604 until a new accumulation period is to start, causing flow to proceed to block 602.

At block 602, an average energy count per cycle is determined by dividing, e.g., right shifting, the total energy count by the number of access cycles associated with the energy count and is provided to a FIFO as needed. This average energy count can be compared to a maximum value to generate an indicator to throttle the operational module as previously discussed. Maintaining an average can eliminate the need for FIFO 321, since the individual energy count values do not need to be maintained.

In another embodiment, two or more accumulation windows are used to detect a change in energy consumption at an operational module to determine if the expected amount of energy likely to be used by the operational module is likely to change faster than a power supply can adapt to provide the additional energy, or conversely, if the amount of energy being dissipated by the operational module is likely to change faster than a power supply can adapt to reduce the amount of energy. By accumulating the energy at two sliding time windows that are adjacent to each other, the change of energy from one time period (the first sliding window) to another time period (the second time window) can be determined by comparing their respective total energy counts. The difference between these values can be compared to one or more threshold values to determine if there is a potential dI/dt issue ad the operational module.

Another embodiment of the present disclosure allows for user programmability of energy table entries. This can allow for calibration of table values based upon other indicators, such as a thermal indicator from an operational module, such as DRAM 212.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical, and electrical changes may be made without departing from the spirit or scope of the invention. In addition, it will be appreciated that the functional blocks shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   receiving, at a first operational module of an electronic device, a first request to affect an energy consumption of a second operational module of the electronic device;
   updating, at the first operational module, an estimated energy consumption of the second operational module based upon the first request;
   providing a control indicator from the first operational module to limit the energy consumption of the second operational module in response to determining, based upon the estimated energy consumption, a heuristic has been met;
   receiving, at the first operational module of the electronic device, a second request to affect the energy consumption of the second operational module, the second request received after the first request;
   updating the estimated energy consumption based upon the second request; and
   providing the control indicator to limit the energy consumption of the second operational module in response to determining, based upon the estimated energy consumption updated by the second request, the heuristic has been met; and
   wherein the estimated energy consumption comprises an accumulation of energy counts of the second operational module for a plurality of requests including the first request and the second request, wherein a energy count associates a measure of energy consumption to requests, including a first energy count to the first request and a second energy count to the second request.

2. The method of claim 1 wherein receiving the request comprises snooping the request at an input of the second operational module.

3. The method of claim 1 wherein receiving the request comprises snooping the request at an input of a third operational module that provides requests to the second operational module.

4. The method of claim 1 wherein the first energy count is the same as the second energy count.

5. The method of claim 1 wherein the first energy count is different than the second energy count.

6. The method of claim 1 wherein the first energy count is an integer.

7. The method of claim 6 wherein the integer is representative of a number of base energy units expected to be consumed by the second operational module in response to the first request.

8. The method of claim 6 wherein the integer is representative of a number of cycles needed by the electronic device to execute the request.

9. The method of claim 1, wherein the heuristic has been met when the estimated energy consumption exceeds a maximum amount of energy within a defined amount of time.

10. The method of claim 9, wherein the request is a first request of a plurality of requests, and the estimated energy consumption is determined by a set of the plurality of requests.

11. The method of claim 10, wherein the defined amount of time is specified by a number of periodic pulses.

12. The method of claim 1, wherein the defined amount of time is user programmable at a storage location.

13. The method of claim 1, wherein the maximum amount of energy is user programmable at a storage location.

14. The method of claim 1 further comprising:
   stopping execution of operations at the second operational module in response to providing the control indicator.

15. The method of claim 14, wherein stopping execution of operations at the second operational module further comprises stopping execution of operations at the second operational module by preventing further requests from being received at the operational module.

16. An electronic device comprising:
- a first operational module;
- a second operational module comprising an input to receive requests from a first interconnect, the requests to control operation of the first operational module;
- a energy accumulation module of the second operational module to maintain an estimated energy consumption of the first operational module at a first storage location based upon the requests, wherein the estimated energy consumption comprises an accumulation of energy counts of the second operational module for the requests including a first request and a second request, wherein a energy count associates a measure of energy consumption to requests, including a first energy count to the first request and a second energy count to the second request; and
- a comparator coupled to the first storage location and to a second storage location to provide a signal to reduce energy consumption at the first operation module in response to determining a energy accumulation value at the energy accumulation module is greater than a value at the second storage location.

17. The method of claim 1, wherein the estimated energy consumption updated by the second request is a first estimated energy consumption for a first amount of time, the control indicator is a first control indicator, and the heuristic is a first heuristic, the method further comprising:
- updating, at the first operational module, a second estimated energy consumption of the second operational module for based upon the first request and the second request, the second estimated energy consumption for a second amount of time;
- providing a second control indicator from the first operational module to limit the second estimated energy consumption of the second operational module in response to determining, based upon the second estimated energy consumption, a second heuristic has been met.

18. The method of claim 17, wherein the second amount of time is an integer multiple of the first amount of time.

19. The method of claim 16, wherein the estimated energy consumption is a first estimated energy consumption for a first amount of time, the energy accumulation module further to maintain a second energy consumption of the first operation module for a second amount of time at a third storage location.

20. The method of claim 17, wherein the second amount of time is an integer multiple of the first amount of time.

* * * * *